No. 897,461. PATENTED SEPT. 1, 1908.
W. A. GREENLAW & H. A. ROYCE.
FLEXIBLE PIPE JOINT.
APPLICATION FILED AUG. 16, 1907.
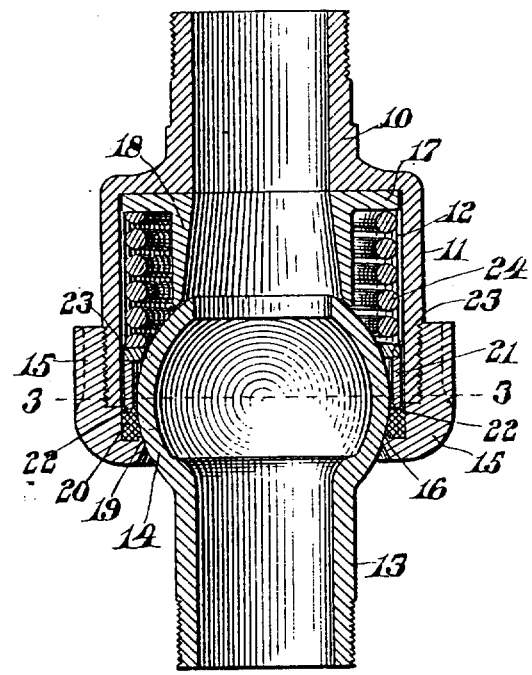
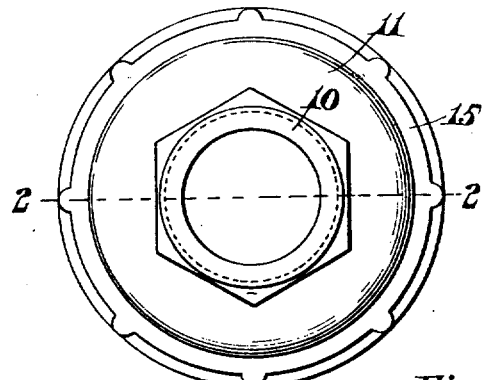
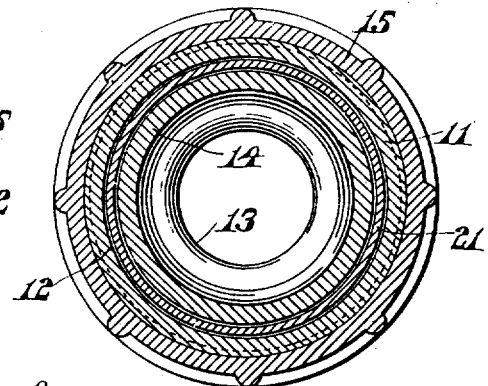
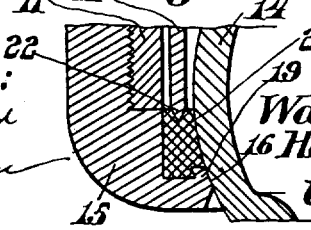
Witnesses:
Nathan C. Lombard
Howard Hanscom
Inventors
Warren A. Greenlaw,
Harrison A. Royce,
by Walter E. Lombard, Atty.

UNITED STATES PATENT OFFICE.

WARREN ALFRED GREENLAW, OF MELROSE HIGHLANDS, AND HARRISON A. ROYCE, OF BOSTON, MASSACHUSETTS, ASSIGNORS TO THE GREENLAW MANUFACTURING CO., OF BOSTON, MASSACHUSETTS, A CORPORATION OF MAINE.

FLEXIBLE PIPE-JOINT.

No. 897,461.

Specification of Letters Patent.

Patented Sept. 1, 1908.

Application filed August 16, 1907. Serial No. 388,861.

*To all whom it may concern:*

Be it known that we, WARREN ALFRED GREENLAW and HARRISON A. ROYCE, citizens of the United States of America, and residents, respectively, of Melrose Highlands, in the county of Middlesex, and Boston, in the county of Suffolk, both in the State of Massachusetts, have invented certain new and useful Improvements in Flexible Pipe-Joints, of which the following is a specification.

This invention relates to flexible pipe joints and has for its object the production of a suitable means for packing the joint between the two pipe members so that leakage is prevented as the material flows from one pipe member to the other.

The invention consists in certain novel features of construction and arrangement of parts which will be readily understood by reference to the description of the drawings and to the claims hereinafter given.

Of the drawings: Figure 1 represents a plan of a pipe joint embodying the features of this invention. Fig. 2 represents a vertical section, the cutting plane being on line 2—2 on Fig. 1. Fig. 3 represents a transverse section, the cutting plane being on line 3—3 on Fig. 2, and Fig. 4 represents an enlarged sectional detail showing the packing and the means for retaining the packing in the ball seat and means for increasing the frictional contact between the packing and the exterior surface of the ball.

Similar characters designate like parts throughout the several figures of the drawings.

In the drawings, 10 represents a pipe member provided with a cup-shaped end 11 made integral therewith and having an interior chamber 12. The co-acting pipe member 13 is provided with a ball end 14 which is adapted to enter the chamber 12 of said cup-shaped member. Threaded to the end of said cup-shaped member 11 is a cap 15 provided with a seat 16 for said ball end 14, this seat 16 preventing the outward movement of said pipe member 13.

Within the chamber 12 is an annular member 17 provided with a tubular stop 18 to limit the inward movement of the ball 14. The cap 15 is provided with an inwardly extending lip 19 having an inclined wall adapted to engage the packing ring 20 and prevent its displacement from the ring 15 when the ball 14 is forced inwardly. Mounted upon the packing ring 20 is an annular ring 21 provided with a wedge-shaped edge 22 having beveled sides which is adapted to be pressed into the packing 20 to spread the same and force the packing into firm contact with the exterior surface of the ball 14 to make an effectual seal to prevent leakage from the chamber 12.

Superimposed upon the ring 21 is a follower, and interposed between the follower 23 and the annular member 17 is a spring 24 which tends to retain the follower 23 and ring 21 in their normal positions and under extraordinary conditions to still further force the wedge-shaped edge 22 into the packing 20 thereby securing an effectual seal as heretofore stated under all conditions.

It is obvious that should any of the material passing through the pipe members 10 and 13 pass into the chamber and endeavor to pass between the exterior walls of the ball 14 and its seat 16 this material would tend to act upon the follower 23 to force the wedge-shaped edge into the packing 20 with the result that a portion of said packing would be wedged so firmly against the surface of the ball 14 that the passage of the material between the two would be absolutely prevented.

The annular inwardly extending lip 19 retains the packing 20 in position at all times and prevents it from entering between the exterior surface of the ball 14 and its seat 16.

It is obvious that any material which enters the chamber 12 will act upon the follower 23 to force the ring 21 into the packing 20 to more effectually seal the joint. This makes a very effectual means of packing a joint of this class and is adapted to operate at any desired angle.

It is believed that the operation of the invention and the many advantages thereof will be fully apparent without further description.

Having thus described our invention, we claim:

1. In a flexible pipe joint, the combination of a pipe member provided with a cup-shaped end; a second pipe member having a ball-shaped end adapted to enter said cup-shaped end; a cap threaded to said cup-shaped end provided with an inwardly extending flange having a rearwardly extending lip the inner wall of which has a groove therein; and an annular packing ring held in position by said lip.

2. In a flexible pipe joint, the combination of a pipe member provided with a cup-shaped end; a second pipe member having a ball-shaped end adapted to enter said cup-shaped end; a seat for said ball secured to said cup-shaped end; a packing interposed between said ball and the walls of said cup-shaped end; a ring with beveled edges bearing upon said packing; and a spring for forcing the beveled edges of said ring into said packing.

3. In a flexible pipe joint, the combination of a pipe member provided with a cup-shaped end; a second pipe member having a ball-shaped end adapted to enter said cup-shaped end; a seat for said ball secured to said cup-shaped end; a packing interposed between said ball and the walls of said cup-shaped end; a ring with beveled edges bearing upon said packing; a spring for forcing the beveled edges of said ring into said packing; and an annular follower between said ring and spring.

4. In a flexible pipe joint, the combination of a pipe member provided with a cup-shaped end; a second pipe member having a ball-shaped end adapted to enter said cup-shaped end; a seat for said ball secured to said cup-shaped end; a packing interposed between said ball and the walls of said cup-shaped end; a ring with beveled edges bearing upon said packing; a spring for forcing the beveled edges of said ring into said packing; an annular follower between said ring and spring; and a removable annular ball stop interposed between said spring and the bottom wall of the chamber in said cup-shaped end.

5. In a flexible pipe joint, the combination of a pipe member provided with a cup-shaped end; a second pipe member having a ball-shaped end adapted to enter said cup-shaped end; a seat for said ball secured to said cup-shaped end; a packing interposed between said ball and the walls of said cup-shaped end; a ring with beveled edges bearing upon said packing; and yieldable means for forcing said ring outwardly to permit the beveled edges thereon to force said packing against the outward face of said ball.

Signed by us at Boston, Mass., this 13th day of August, 1907.

WARREN ALFRED GREENLAW.
HARRISON A. ROYCE.

Witnesses:
WALTER E. LOMBARD,
NATHAN C. LOMBARD.